A. PETITO.
SHOCK ABSORBER.
APPLICATION FILED DEC. 5, 1917.

1,274,321.

Patented July 30, 1918.

Inventor
ANDREA PETITO
By Watson E. Coleman
Attorney

UNITED STATES PATENT OFFICE.

ANDREA PETITO, OF TRENTON, NEW JERSEY.

SHOCK-ABSORBER.

1,274,321.  Specification of Letters Patent.  Patented July 30, 1918.

Application filed December 5, 1917. Serial No. 205,642.

*To all whom it may concern:*

Be it known that I, ANDREA PETITO, a citizen of the United States, residing at Trenton, in the county of Mercer and State of New Jersey, have invented certain new and useful Improvements in Shock-Absorbers, of which the following is a specification, reference being had to the accompanying drawings.

This invention relates to shock absorbers and it is an object of the invention to provide a novel and improved device of this general character wherein the shock effected by two relatively movable members is absorbed by a frictional contact by relatively rotatable members.

It is also an object of the invention to provide a novel and improved device of this general character wherein the parts comprised therein may be assembled with convenience and facility.

Another object of the invention is to provide a novel and improved device of this general character wherein the frictional coacting members are maintained in requisite contact one with the other through the medium of an expansible member.

The invention consists in the details of construction and in the combination and arrangement of the several parts of my improved shock absorber wherein certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood I will now proceed to describe the same with reference to the accompanying drawings wherein.

Figure 1:
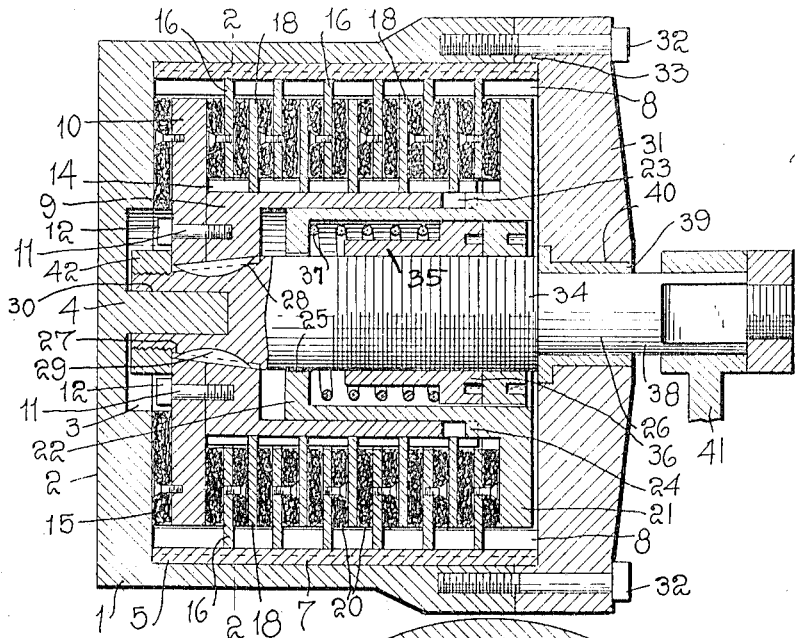
Figure 1 is a sectional view taken through an absorber constructed in accordance with an embodiment of my invention with portions thereof in elevation.
Figure 2:
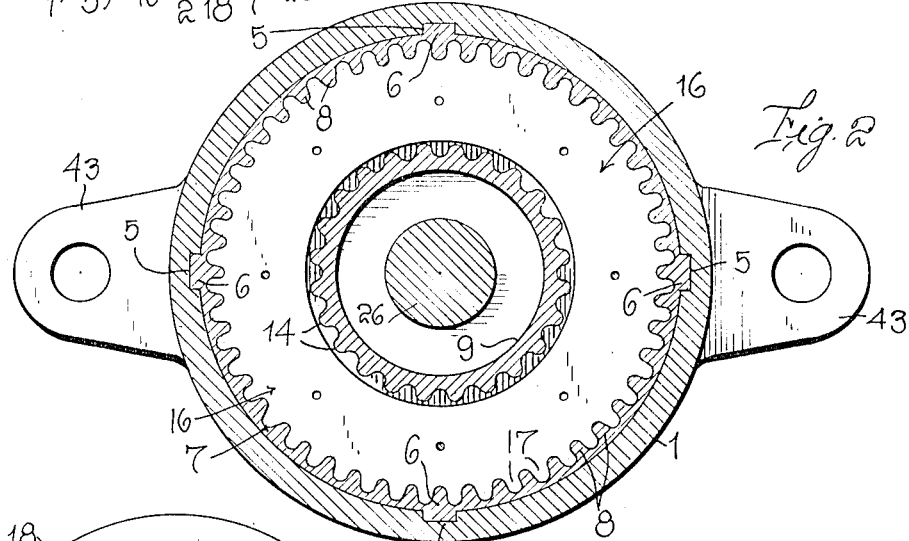
Fig. 2 is a sectional view taken substantially on the line 2—2 of Fig. 1.
Figure 3:
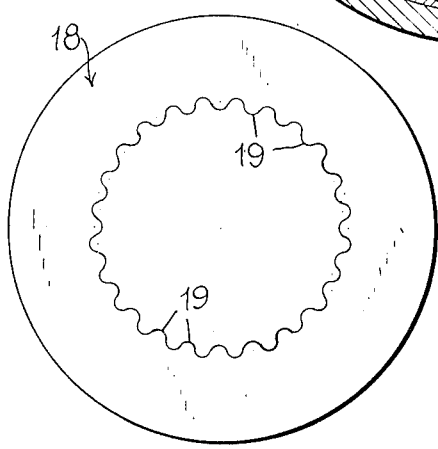
Fig. 3 is an elevational view of one of the friction members detached.

As disclosed in the accompanying drawings 1 denotes a cylindrical member having one end open and which is provided at the inner face of its closed end 2 with a circular recess 3. Extending from the axial center of the recess 3 is a trunnion 4 of such a length as to extend beyond the inner faces of the closed end 2 of the member 1. The inner face of the side wall of the body 1 is provided with the longitudinally disposed grooves or channels 5 equi-distantly spaced one from the other and preferably four in number and which are adapted to receive the longitudinally disposed ribs 6 carried by the outer face of the sleeve 7. The sleeve 7 snugly fits within the body 1 and is of a length to extend a slight distance beyond the open end of the body 1 as is particularly illustrated in Fig. 1. The inner face of the sleeve 7 is provided entirely therearound with the longitudinally disposed teeth 8 extending the entire length of the sleeve for a purpose to be hereinafter more particularly referred to. 9 denotes a cup like member positioned within the body 1 adjacent the closed end thereof and secured to the base portion of the member 9 is a plate or disk 10 of a diameter in excess of the member 9 and of a diameter less than the mean diameter of the sleeve 7 so that said disk 10 and member 9 may have rotary movement within the body 1. As particularly illustrated in Fig. 1 the disk 10 is secured to the base portion of the member 9 through the medium of the headed screws 11 and as is illustrated in Fig. 1 it is to be noted that the recess 3 is of such a diameter as to receive the heads 12 of said members 11 so that no obstruction will be afforded to the rotary movement of the disk 10. The periphery of the body 9 is also provided entirely therearound with the longitudinally disposed teeth 14 extending the entire length thereof. The outer face of the extended portion of the disk 10 has secured thereon the lamination 15 of wear resisting material and preferably of a character generally employed for brake lining. The lamination 15 contacts with the inner face of the closed end 2 of the member 1 as is particularly illustrated in Fig. 1 of the accompanying drawings.

Positioned inwardly of the extended portion of the disk 10 is a plurality of annular members 16 in predetermined spaced relation and freely surrounding the member 9. The periphery of each of the members 16 is provided with the teeth 17 meshing with the teeth 8 of the sleeve 7 whereby said member 16 is held against rotary movement independently of the sleeve but is capable of slidable movement longitudinally thereof. Surrounding the member 9 is a plurality of annular members 18 in predetermined spaced relation and extending between the members 16. Each of the members 18 has its periphery free of the teeth 8 of the sleeve 7, but is provided with internal teeth 19 in mesh with the teeth 14 of the member 9 whereby said member 18 is keyed to the member 9 but capable of movement longitudinally thereof. Secured to the opposite faces of the members 16 are laminations 20 of wear resisting material of the same character as the lamination 15. The laminations 20 are adapted to contact with the adjacent faces of the annular members 18 and also with the inner face of the extended portion of the disk 10 and with the outstanding annular flange 21 arranged at the open end portion of the second cup-like member 22. The second cup-like member 22 is slidably engaged with the first named member 9 and the open end portion of the member 9 is provided with the open recesses 23 in which are seated the lugs 24 carried by the member 22 whereby said members 9 and 22 are keyed one to the other.

The base portion of the member 22 is provided with an opening 25 through which is directed an end portion of a shaft 26 and the inner end portion of said shaft 26 is tapered as at 27 and disposed through registering openings 28 formed in the base portion of the member 9 and the disk 10 and secured thereto through the medium of the keys 29. The inner end portion of the shaft 26 is provided with a cylindrical bore 30 to receive the inner or free end portion of the trunnion 4 whereby a mounting is afforded for the inner end portion of the shaft 26. Closing the open end of the body 1 is a cap 31 held to the body 1 through the medium of the clamping bolts 32 or the like and said cap is provided at its margin with an annular flange 33 to compensate for the extended portion of the sleeve 7. As is clearly illustrated in Fig. 1 the cap 31 contacts directly with the adjacent end of the sleeve 7 so that said sleeve is held against endwise movement independently of the body 1. A portion 34 of the shaft 26 within the body 1 is threaded and engaged with said threaded portion 34 is a sleeve 35 provided at its outer end with an enlarged head 36. Surrounding the sleeve 35 and the shaft 26 is an expansible member 37, herein disclosed as a conventional coil spring, interposed between the enlarged head 36 and the base portion of the member 22. The expansible member 37 is of sufficient tension to maintain the laminations 15 and 20 in proper contact with the co-acting faces or surfaces of the annular member 16 and the flange 21. The portion 38 of the shaft 26 in advance of the threaded portion 34 is reduced and disposed through the brass bushing 39 or the like fitted within an opening 40 arranged at the axial center of the cap 31. The shaft 26 extends beyond the cap 31 and suitably secured to said extended portion is a rock lever 41. The opposite end portion of the shaft 26 extending beyond the disk 10 has threaded thereto a binding nut 42 for a purpose which is believed to be clearly apparent to those skilled in the art to which my invention pertains. The closed end portion of the body 1 is provided with the diametrically opposed perforate ears 43 to afford means whereby the same may be secured to one of the two relatively movable members. The lever 41 is adapted to be suitably secured to the second relatively movable member and it will be perceived that upon relative movement of such members, (not shown) the frictional contact between the relatively movable members comprised in my improved device will serve to absorb the shock incident to such movement.

From the foregoing description, it is thought to be obvious that a shock absorber constructed in accordance with my invention is particularly well adapted for use by reason of the convenience and facility with which it may be assembled and operated and it will also be obvious that my invention is susceptible of some change and modification without materially departing from the principles and spirit thereof and for this reason I do not wish to be understood as limiting myself to the precise arrangement and formation of the several parts herein shown in carrying out my invention in practice except as hereinafter claimed.

I claim:

1. A shock absorber comprising a hollow body having one end closed and provided with securing means, a shaft disposed axially of the body and mounted for rotary movement, said shaft being provided with means for rocking the same, a cup like member within the body and secured to the shaft, the closed end portion of said member being provided with an annular extension, an annular member surrounding the cup like member and keyed to the hollow member, said annular member being capable of movement longitudinally of the hollow member, a second annular member keyed to the cup like member, said second annular member being capable of movement longitudinally of the cup like member, and means within the cup-like member for constantly urging the annular members in a direction toward the annular extension of the cup like member and maintaining the annular member in frictional contact, the annular extension of the cup-like member being in frictional contact with the closed end of the hollow body.

2. A shock absorber comprising a hollow body provided with securing means, a shaft disposed axially of the body and mounted for rotary movement, said shaft being provided with means for rocking the same, a cup like member within the body and secured to the shaft, the closed end portion of said member being provided with an annular extension, an annular member surrounding the cup like member and keyed to the hollow member, said annular member being capable of movement longitudinally of the hollow member, a second annular member keyed to the cup like member, said second annular member being capable of movement longitudinally of the cup like member, a second cup like member telescopically engaged with the first cup like member and provided with an annular flange overlying and contacting with the first named annular member, an enlargement carried by the shaft, and an expansible member interposed between the enlargement of the shaft and the base portion of the second named cup like member.

3. A shock absorber comprising a hollow body provided with securing means, a shaft disposed axially of the body and mounted for rotary movement, said shaft being provided with means for rocking the same, a cup like member within the body and secured to the shaft, the closed end portion of said member being provided with an annular extension, an annular member surrounding the cup like member and keyed to the hollow member, said annular member being capable of movement longitudinally of the hollow member, a second annular member keyed to the cup like member, said second annular member being capable of movement longitudinally of the cup like member, a second cup like member telescopically engaged with the first cup like member and provided with an annular flange overlying and contacting with the first named annular member, an enlargement carried by the shaft, an expansible member interposed between the enlargement of the shaft and the base portion of the second named cup like member, said second named cup like member being keyed to the first named cup like member but capable of limited movement longitudinally of the shaft and independently of the first named cup like member.

4. A shock absorber comprising a hollow body provided with securing means, a shaft disposed axially of the body and mounted for rotary movement, said shaft being provided with means for rocking the same, a cup-like member within the body and secured to the shaft, the closed end of said member being provided with an annular extension, an annular member surrounding the cup-like member and keyed to the hollow member, said annular member being capable of movement longitudinally of the hollow member, a second annular member keyed to the cup-like member and capable of movement longitudinally thereof, a second cup-like member telescopically engaged with the first cup-like member and provided with an annular flange overlying the annular members, an enlargement arranged within the second named cup-like member and threaded upon the shaft, and an expansible member arranged within the second cup-like member and interposed between the base portion of the second cup-like member and the enlargement on the shaft whereby the annular flange of the second cup-like member urges the annular members in a direction toward the annular extension of the first cup-like member and maintains the annular members in contact one with the other and with the annular extension of the first named cup-like member.

In testimony whereof I hereunto affix my signature in the presence of two witnesses.

ANDREA PETITO.

Witnesses:
JAMES F. PERETI,
CARMINE MIGLIOICCIO.